(12) United States Patent
Forgette et al.

(10) Patent No.: US 10,870,393 B1
(45) Date of Patent: Dec. 22, 2020

(54) HEADLINER FOR A VEHICLE

(71) Applicant: Ford Global Technologies, LLC, Dearborn, MI (US)

(72) Inventors: Paul Alan Forgette, Brownstown, MI (US); Carlos Ernesto Saenz, Calimaya (MX); John Andrew Stakoe, Bloomfield Hills, MI (US); Jason Baughman, Belleville, MI (US); Katherine Ann Arnold, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/593,241

(22) Filed: Oct. 4, 2019

(51) Int. Cl.
*B60Q 3/208* (2017.01)
*B60Q 3/51* (2017.01)
*B60R 13/02* (2006.01)
*B29C 43/14* (2006.01)
*B29L 31/30* (2006.01)

(52) U.S. Cl.
CPC ............ *B60Q 3/208* (2017.02); *B29C 43/146* (2013.01); *B60Q 3/51* (2017.02); *B60R 13/0231* (2013.01); *B29L 2031/3005* (2013.01)

(58) Field of Classification Search
CPC .................. B60Q 3/78; B60Q 3/208
USPC .................................. 362/459–549
See application file for complete search history.

(56) References Cited

U.S. PATENT DOCUMENTS

| | | | |
|---|---|---|---|
| 3,433,526 | A | 3/1969 | Field et al. |
| 9,145,086 | B2 | 9/2015 | Moussa |
| 10,272,832 | B2 | 4/2019 | Xu et al. |
| 2002/0001706 | A1 | 1/2002 | Yamagata et al. |
| 2006/0269642 | A1* | 11/2006 | Yoshida .................. B29C 55/24 425/326.1 |
| 2013/0058115 | A1* | 3/2013 | Pfeil ........................ B60Q 3/64 362/511 |

FOREIGN PATENT DOCUMENTS

| | | |
|---|---|---|
| EP | 1302370 A2 | 4/2003 |
| ES | 2657602 T3 | 3/2018 |
| KR | 19990034902 A | 5/1999 |

* cited by examiner

*Primary Examiner* — William J Carter
(74) *Attorney, Agent, or Firm* — David Coppiellie; Price Heneveld LLP

(57) ABSTRACT

A headliner for a vehicle includes a substrate that attaches to, and covers a roof panel, the substrate defining a groove on a first side formed around an entirety of a periphery of an area of the roof panel, wherein the groove is continuous around the periphery. A light emitting material is disposed within the groove formed in the substrate and is uninterrupted around the periphery within the groove.

20 Claims, 6 Drawing Sheets

HEADLINER FOR A VEHICLE

FIELD OF THE INVENTION

The present disclosure generally relates to headliners for vehicle roof panels. In particular, the present disclosure relates to a headliner formed with a groove to receive a light emitting material within a substrate of the headliner.

BACKGROUND OF THE INVENTION

Vehicle roof panels may include a window, or sun and moon roof panels. To further aid in seeing the window, the roof panel may include a light pipe fastened to a bezel. The bezel may create a visible gap between the bezel and a headliner for the roof panel disposed around the window. Additionally, the light pipe may be secured to the bezel using a plurality of brackets and fasteners. Adding a plurality of brackets and fasteners to support the light pipe on the bezel in the headliner adds manufacturing complexity, including additional component tooling and assembly methods, and increases the mass of the roof panel and headliner. The increased mass may also reduce the overall fuel economy.

SUMMARY OF THE INVENTION

According to a first aspect of the present disclosure, a headliner for a vehicle includes a substrate that attaches to, and covers a roof panel, the substrate defining a groove on a first side formed around an entirety of a periphery of an area of the roof panel to emphasize a feature on the headliner, wherein the groove is continuous around the periphery. A light emitting material is disposed within the groove formed in the substrate, and is uninterrupted around the periphery within the groove.

Embodiments of the first aspect of the disclosure can include any one or a combination of the following features:
  the groove defines first and second sections, the first section having a width being less than a diameter of the second section and a diameter of the light emitting material;
  the area of the roof panel is indicative of a window such that the light emitting material extends around a periphery of the window;
  the substrate is configured to be heated on a second side to form the groove;
  the groove is formed at a predetermined distance into the headliner from the first side toward the second side such that the light emitting material and first side are flush;
  the predetermined distance is between 2 to 3 millimeters; and
  the groove is formed by a mandrel having an expandable end such that first and second portions of the mandrel are oppositely oriented and expand away from a center of the mandrel to a distance greater than a diameter of the light emitting material.

According to a second aspect of the present disclosure, a vehicle comprises a roof panel having a headliner assembly attached thereto, wherein the headliner assembly includes a groove, being continuous, formed around an entirety of a periphery of an area to emphasize a feature on the headliner. A light emitting material is disposed within the groove such that light from the light emitting material is emitted toward an interior of the vehicle.

Embodiments of the second aspect of the disclosure can include any one or a combination of the following features:
  the headliner assembly includes a substrate having a first side, and a second side, wherein the groove and light emitting material are disposed on the first side of the substrate;
  the groove is formed with a mandrel having an end that expands the first side of the substrate in response to a plunger sliding within the mandrel in a direction of the second side with heat being applied to the second side;
  the end of the mandrel includes two, oppositely oriented portions that expand to a width greater than a diameter of the light emitting material;
  the groove is molded to match a contour of the headliner assembly;
  the groove defines a depth such that the light emitting material is flush with the substrate of the headliner assembly; and
  the groove is continuous such that the light emitting material extends around the periphery of the window uninterrupted.

According to a third aspect of the present disclosure, a method of forming a headliner for a vehicle comprises forming a substrate having first and second sides, heating the second side of the substrate, driving a mandrel into the first side of the substrate, actuating a plunger through the mandrel such that first and second portions of the mandrel expand away from a centerline of the plunger to form a groove within the first side of the substrate, and retracting the plunger and mandrel from the substrate.

Embodiments of the third aspect of the invention can include any one or a combination of the following steps and/or features:
  inserting a light emitting material into the groove;
  inserting the light emitting material into the groove includes extending the light emitting material around a periphery of a roof panel, the light emitting material being uninterrupted around the periphery;
  forming the groove to match a contour of the headliner;
  actuating the plunger defines a depth of the groove such that the light emitting material is flush with the second side of the substrate; and
  the first and second portions of the mandrel expand to a diameter greater than a diameter of the light emitting material.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
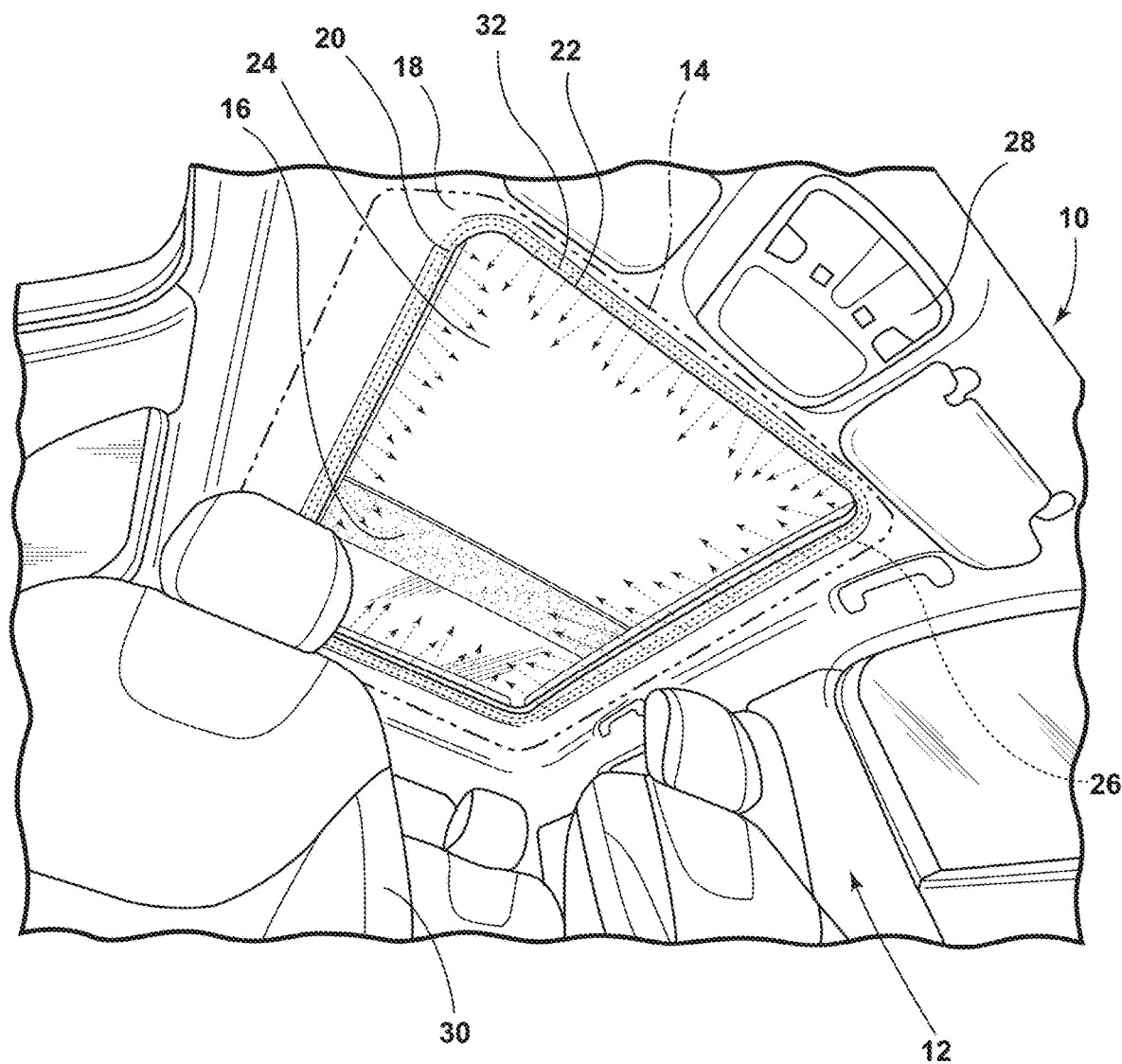
FIG. 1 is a perspective view of an interior of a vehicle depicting a headliner having a light emitting material disposed within the headliner.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction, or the like, does not mean that the feature or component follows a straight line or axis in such a direction or that it only extends in such direction or on such a plane without other directional components or deviations, unless otherwise specified.

FIG. 1 depicts a vehicle 10 with an interior area 12. Specifically, FIG. 1 depicts a perspective view of the interior area 12 depicting a roof panel 14 with a window 16 disposed within the roof panel 14. As will be described in more detail below, the roof panel 14 may be covered by a headliner 18. The headliner 18 may define a groove 20 formed around a periphery 22 of an area 24 of the roof panel 14. The area 24 may be filled by the window 16. The area 24 may also be any area 24 surrounded by the groove 20. The groove 20 may be defined to receive a light emitting material 26. The light emitting material may be any flexible material that emits light, such as, but not limited to light ropes, light pipes and fiber optics. While shown and described as an area 24 of a roof panel 14, the area, including the groove 20 that receives the light emitting material 26, may be defined on any panel for the vehicle 10, such as, but not limited to, door panels, instrument panels, dash panels, floors, and fabrics covering floors. As depicted in FIG. 1, the light emitting material 26 may be received in the groove 20 around the periphery 22 of the area 24 defined by the window 16 in the headliner 18. As generally indicated by the arrows depicted in FIG. 1, the light emitting material 26 may be configured to emit light into the interior area 12 of the vehicle 10. Light admission into the interior area 12 of the vehicle 10 increases visibility during use of the vehicle 10.

Increasing visibility during use of the vehicle 10 may aid an occupant (not shown) in operating interior controls 28, such as, but not limited to, switches that move the window 16 within the area 24, as is commonly used in sunroof applications or a mechanized cover (not shown) to cover the window 16, as is commonly used in moonroof applications. The interior controls 28 may also be used to activate the light emitting material 26 to increase visibility in the interior area 12 of the vehicle 10. Additionally, the light emitting material 26 may be activated in response to a lumen level in the interior area 12 of vehicle 10 being less than a lumen threshold, which is indicative of the interior area 12 being dark or having low visibility. Stated differently, the light emitting material 26 may be activated manually by an occupant, or automatically in response to a lumen level of the interior area 12 of the vehicle 10. The light emitting material 26 may also be illuminated in response to other vehicle controls (not shown), such as activating the light emitting material 26 to illuminate the interior area 12 in response to an unlocked command, or as a preference for an occupant detected within a seat 30.

The groove 20 may be formed directly to the headliner 18, which is a class A surface. Stated differently, the groove 20 may be molded in the headliner 18 such that the light emitting material 26 is supported within the groove 20 without fasteners or bezels. As will be described in more detail below, geometrical features of the groove 20 retain the light emitting material 26 in the headliner 18 around the periphery 22. This allows the light emitting material 26 to extend around the periphery 22 uninterrupted. By reducing reliance on fasteners and bezels, the groove 20 reduces segmenting the light emitting material 26 around the periphery 22 in discrete sections (not shown). Further, by reducing reliance on fasteners and bezels, the groove 20 reduces tooling and eliminates components from the headliner 18, which further reduces overall mass of the vehicle 10 and aids to improve fuel economy. As will be described with reference to the other figures, the groove 20 may be molded into a substrate 50 of the headliner 18 such that the light emitting material 26 is flush with a class A surface of the headliner 18.

Figure 2:
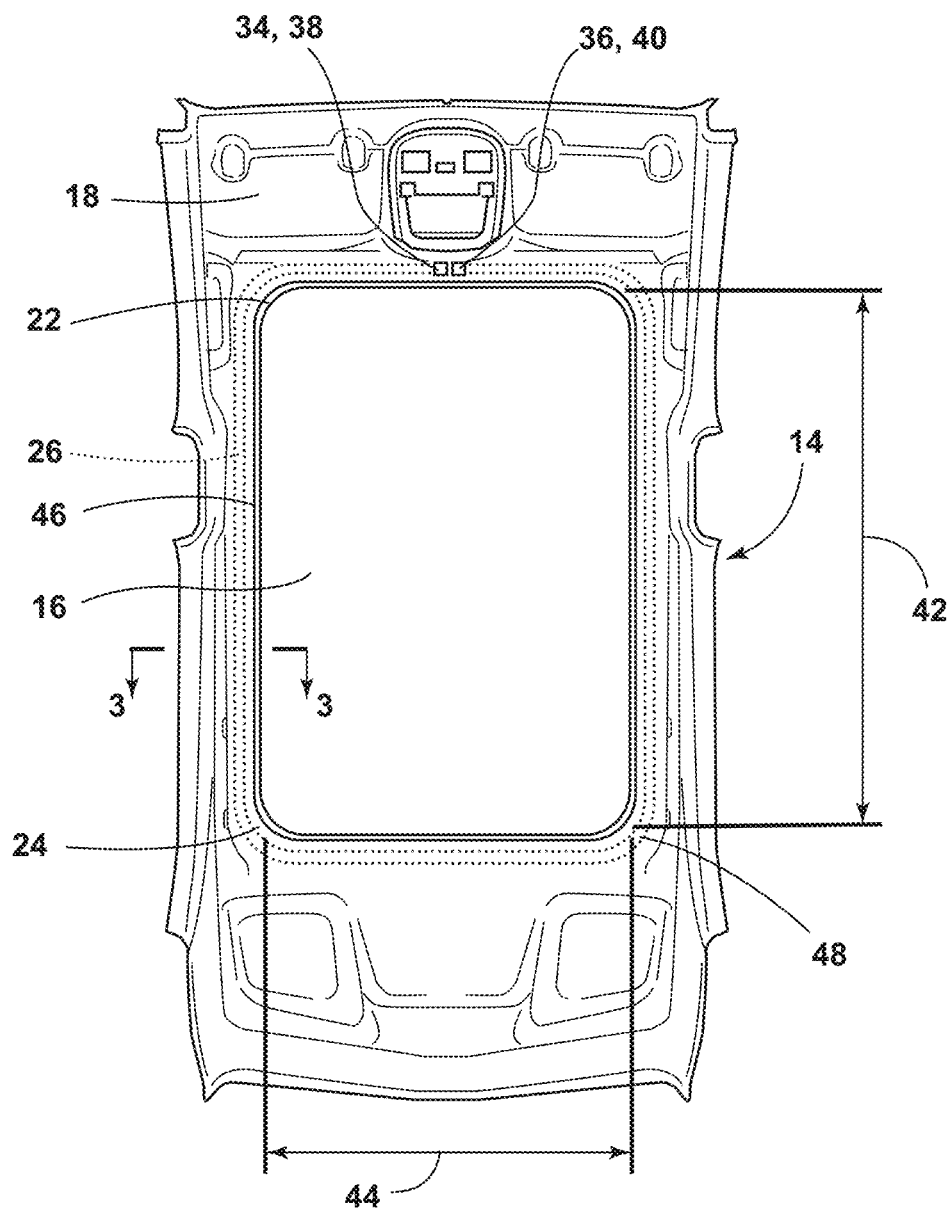
FIG. 2 is a bottom view of the headliner depicting the light emitting material surrounding a window disposed within a roof panel.

FIG. 2 depicts a bottom view of the headliner 18 showing, schematically, the light emitting material 26 extending around the periphery 22 of the window 16. Again, the light emitting material 26 is depicted as extending uninterrupted within the groove 20. Therefore, the groove 20 is formed as continuous around the periphery 22 in the headliner 18. The groove 20 may be a single groove formed continuously around the periphery 22 of the area 24 defined by the window 16 to allow a single light emitting material 26 to be supported within the groove 20. The light emitting material 26 may be uninterrupted within the continuous groove 20 such that the light emitting material 26 extends from a first position 34 in the groove 20 around the periphery 22 of the area 24 to a second position 36. The first position 34 and the second position 36 may be directly adjacent, or at substantially the same point such that a distance (not shown) between the ends 38, 40 is negligible. In a similar manner, the light emitting material 26 includes a first end 38 at the first position 34 and a second end 40 at the second position 36, in which the second end 40 abuts the first end 38. Additionally, the second end 40 may contact the first end 38 to allow the light emitting material 26 to be uninterrupted around the periphery 22 of the area 24.

As shown in FIG. 2, the light emitting material 26 may extend around the periphery 22 of the area 24 such that a length 42 and a width 44 of the periphery 22 are illuminated by the light emitting material 26. Specifically, the area 24, as depicted in FIG. 2 may define a rectangular shape such that the light emitting material 26 extends along the length 42 and the width 44 of four sides of the periphery 22. While shown and described as substantially rectangular, a shape of the area 24 that defines the periphery 22 may be any desired shape in the headliner 18 of the roof panel 14. Again, the first and second positions 34, 36 may be defined anywhere along the periphery 22 in the continuous groove 20 such that the second end 40 of the light emitting material 26 abuts, is in contact with, or is directly adjacent the first end 38. The first end 38 may be directly adjacent to the second end 40 if a distance between the first and second positions 34, 36 is negligible. Defining the first and second positions 34, 36 with the first and second ends 38, 40 of the light emitting material 26 as being directly adjacent allows the light emitting material 26 to extend around each and every side 46 of the area 24 such that the entire periphery 22 of the area 24 is illuminated by the light emitting material 26.

Illuminating each of the sides 46 of the periphery 22 of the area 24 with the light emitting material 26 allows for greater emission of light into the interior area 12 the vehicle 10. The greater emission of light into the interior area 12 by extending the light emitting material 26 in the continuous groove 20 around each of the sides 46 of the periphery 22 allows for greater visibility of the interior area 12 for the occupants, as previously described. The uninterrupted light emitting material 26 in the continuous groove 20 creates more efficient packaging of the light emitting material 26 and allows the light emitting material 26 to extend through portions 48, such as corners not covered by segmented light pipes fastened to bezels at each of the sides 46 of the periphery 22 of the area 24, as previously described. For example, the groove 20 being continuous around each of the sides 46 of the periphery 22 of the area 24 allows the light emitting material 26 to emit more light into the interior area 12 at each of the portions 48 with less packaging space and fewer components than segmented light pipes fastened to bezels at each of the sides 46. Therefore, forming the groove 20, as continuous, in the headliner 18 provides further advantages for illuminating the interior area 12 using the light emitting material 26.

Figure 3:
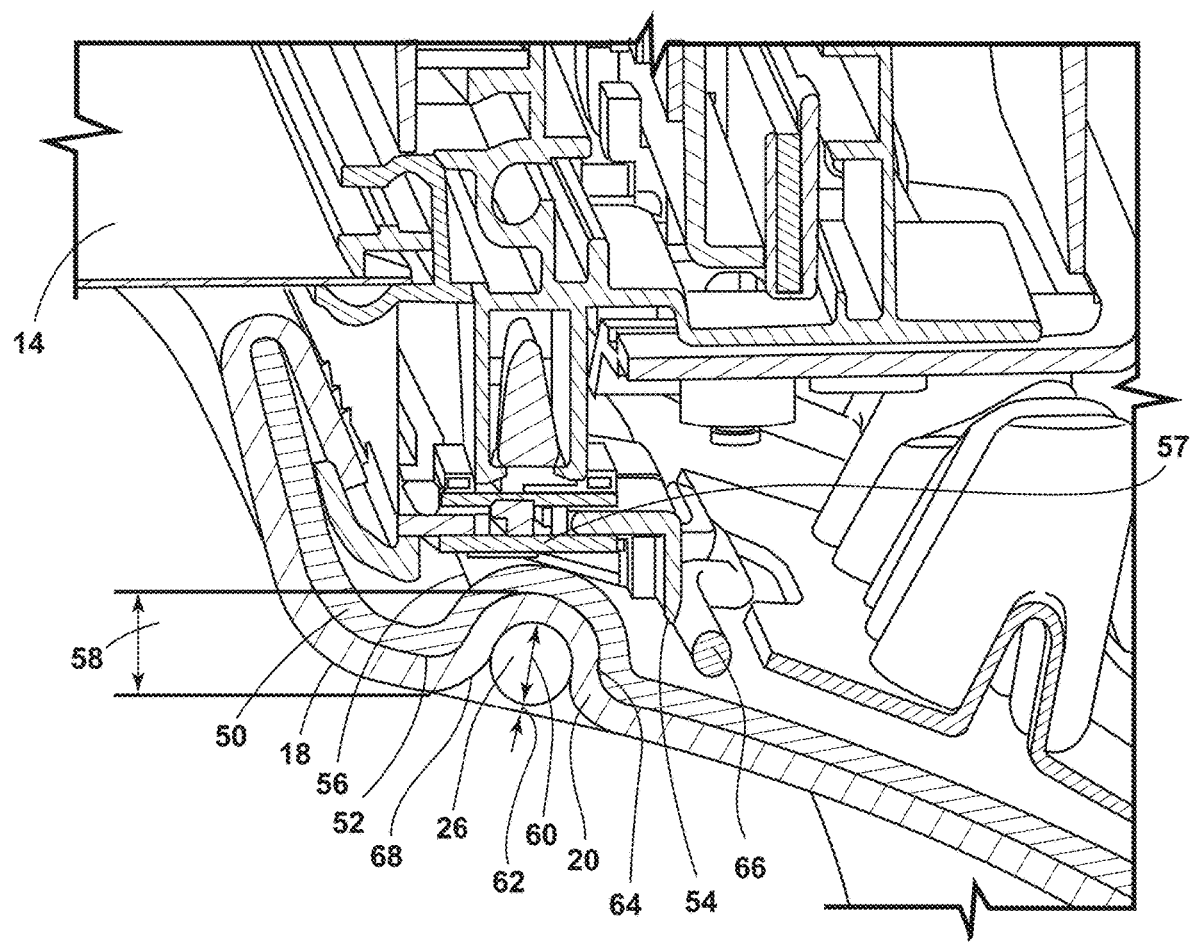
FIG. 3 is a cross-sectional view of the headliner depicting the light emitting material being disposed with a groove formed in a substrate of the headliner.

Referring to FIG. 3, a cross-sectional view taken along the lines 3-3 of the headliner 18 attached to the roof panel 14 is depicted. Specifically, FIG. 3 schematically depicts a cross-sectional view of the groove 20 with the light emitting material 26 disposed within the headliner 18. As shown, the headliner 18 includes a substrate 50. The groove 20 is formed on a first side 52 of the substrate 50. As described above, the groove 20 may be molded through the first side 52 of the substrate 50 such that the light emitting material 26 is substantially flush with the headliner 18. As will be described in more detail below, the groove 20 may be molded through the first side 52 of the substrate 50 to a second side 54 of the substrate 50. The second side 54 of the substrate 50 may be disposed oppositely from the first side 52 of the substrate 50. The substrate 50 may be formed from a thermoplastic material to allow the groove 20 to be molded within the headliner 18. In at least one other instance, the substrate 50 may be formed from any material having pliability characteristics to allow the groove 20 to extend and be molded through the first side 52 to the second side 54 of the substrate 50.

The headliner 18 may define a space 56 adjacent the second side 54 of the substrate 50 to allow the groove 20 to be molded within the substrate 50 and avoid interference between the groove 20 and attachment components 57 used to support the headliner 18 on the roof panel 14. The space 56 allows the groove 20 to be formed on the substrate 50 such that the light emitting material 26 is flush with the headliner 18. Stated differently, the groove 20 may be formed having a depth 58 from the second side 54 to the first side 52 of the substrate 50 based on the space 56 to avoid interference with the attachment components 57. The depth 58 may be variable based on vehicle size and a weight of the headliner 18 such that the attachment components 57 support the headliner 18 on the roof panel 14. For example, larger vehicles, such as, but not limited to, trucks, vans, and sport utility vehicles, may have different attachment requirements than smaller vehicles, such as, but not limited to, sedans, compacts, and sport vehicles, and the depth 58 may be based on an available space 56 to form the groove 20 such that the light emitting material 26 is flush with the headliner 18. The depth 58 may also define a diameter 60 of the light emitting material 26. For example, larger vehicles may include a groove 20 having a depth 58 greater than a depth 58 of a groove 20 used for smaller vehicles. Therefore, larger vehicles may use a light emitting material 26 having a diameter 60 being greater than a diameter 60 of a light emitting material 26 used for smaller vehicles based on the greater depth 58 of the groove 20 for larger vehicles.

Again, the light emitting material 26 may be disposed in the groove 20 such that the light emitting material 26 is flush with the headliner 18. Specifically, the depth 58 of the groove 20 may be such that the light emitting material 26 is disposed at a predetermined distance 62 from the headliner 18. The predetermined distance 62 may be defined based on the depth 58 of the groove 20 as well as the diameter 60 of the light emitting material 26 such that the light emitting material 26 appears in-line with the headliner 18. The predetermined distance 62 may be defined based on the diameter 60 of the light emitting material 26. For example, the diameter 60 of the light emitting material 26 may be variable based on vehicle size, as described above, and a larger diameter 60 of the light emitting material 26 for larger vehicles may have a greater predetermined distance 62 to appear flush with the headliner 18 than smaller vehicles. Again, the predetermined distance 62 may be set based on an appearance of the light emitting material 26 being flush with the headliner 18 to increase an aesthetic appeal of the headliner 18. In at least one instance, the predetermined distance 62 may be between 2-3 mm.

The groove 20 may be molded such that a contour 64 of the groove 20 matches a contour 66 of the headliner 18. As shown, the contour 64 of the groove 20 matches the contour 66 of the headliner 18 to allow the light emitting material 26 to be flush with the headliner 18. Specifically, an edge 68 of the groove 20 defines the contour 64 of the groove 20 such that the predetermined distance 62 allows the light emitting material 26 to be flush with, and not extend beyond, the contour 66 of the headliner 18. Additionally, the edge 68 of the groove 20 defines the contour 64 of the groove 20 complementary to the contour 66 of the headliner 18 such that the groove 20 is imperceptible from the headliner 18 with the light emitting material 26 disposed within the groove 20. The edge 68, therefore, of the groove 20 may define a radius (not shown) substantially equal to a radius (not shown) of the headliner 18 to match the contour 64 of the groove 20 to the contour 66 of the headliner 18. Matching the contour 64 of the groove 20 with the contour 66 of the headliner 18 further allows the light emitting material 26 to emit light into the interior area 12 while maintaining the aesthetic appeal of the headliner 18. Therefore, the light emitting material 26 disposed within the groove 20 may appear as unitary with the headliner 18.

Figure 4A:
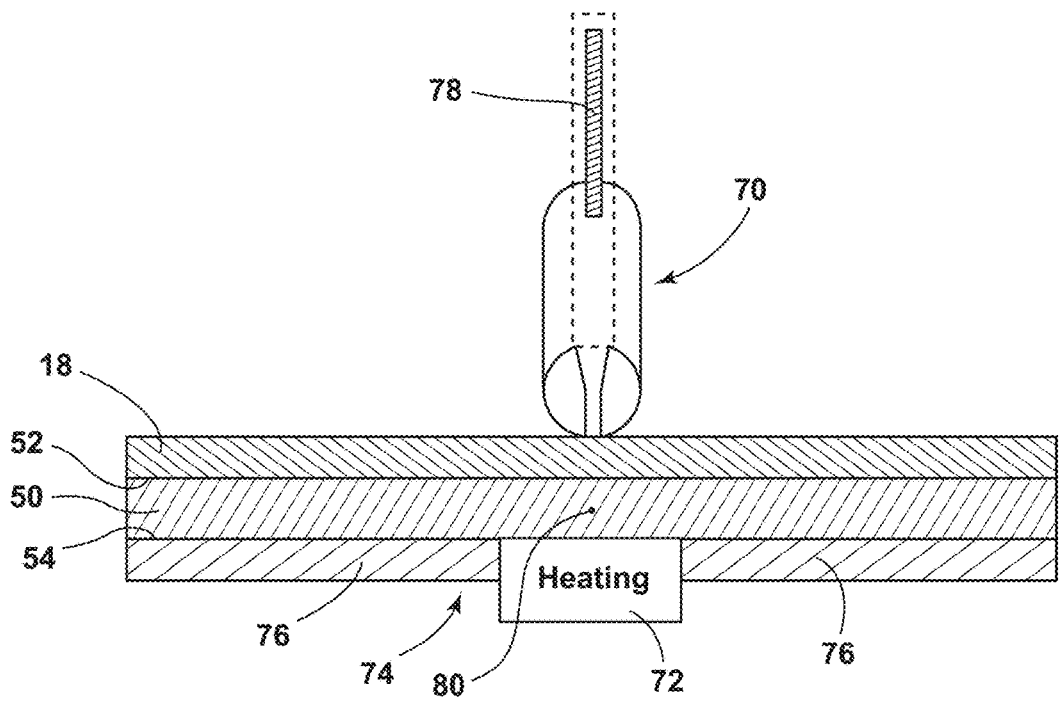
FIGS. 4A-4E schematically depict forming the groove to support the light emitting material in the substrate of the headliner.
Figure 4B:
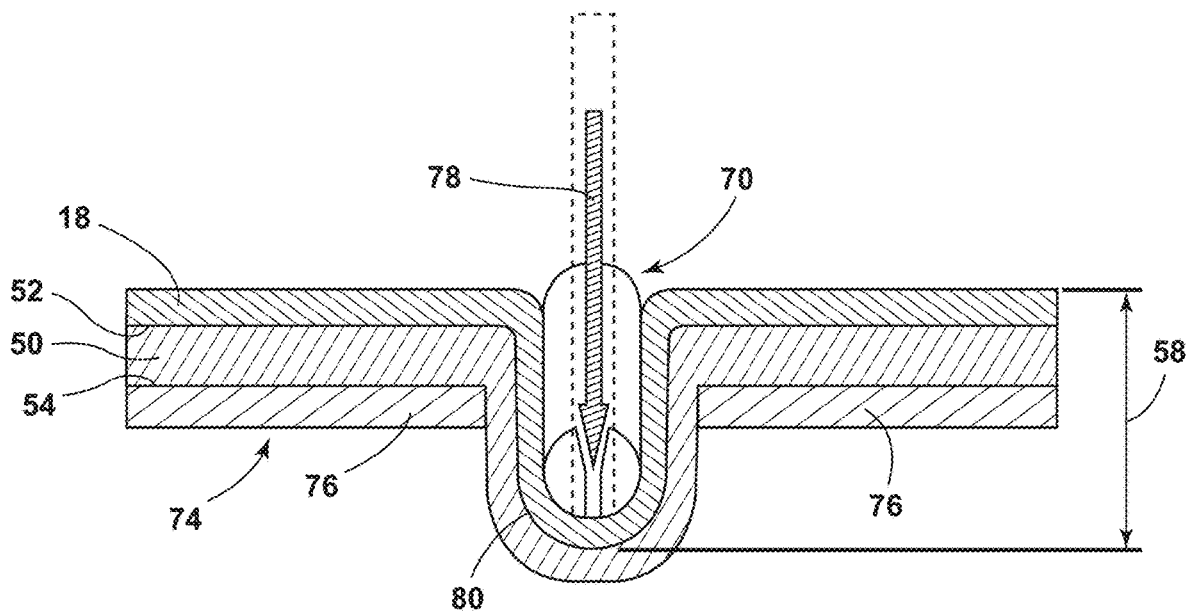
Figure 4C:
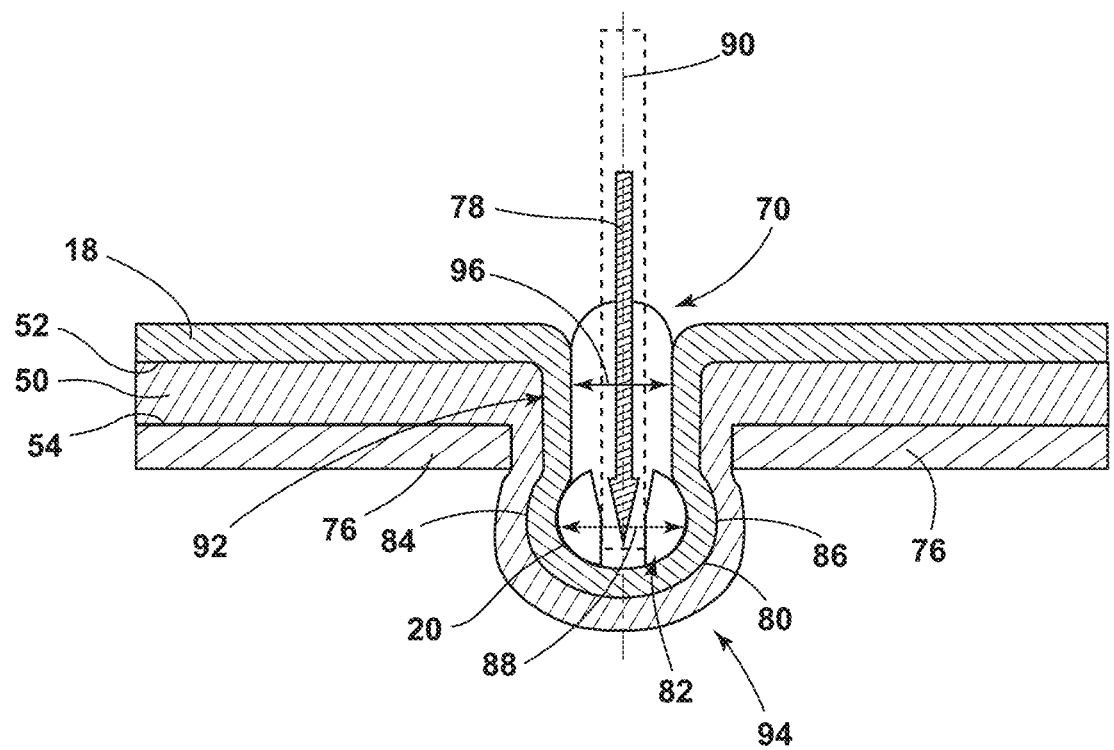

FIGS. 4A-4E depict schematic views of a method of forming the groove 20 into the substrate 50 of the headliner 18. Specifically, the substrate 50 attaches to, and covers the roof panel 14 such that the substrate 50 is disposed between the headliner 18 and the roof panel 14. FIGS. 4A-4C depict highly schematic views of a mandrel 70 forming the groove 20 in the first side 52 of the substrate 50. As will be described in more detail below, the second side 54 of the substrate 50 may be heated to allow the mandrel 70 to press into the headliner 18 and expands to form the groove 20 on the first side 52 of the substrate 50. The mandrel 70 may be a component added to a thermal edge-folding machine 74, and be used simultaneously with an edge-fold process (not shown) of the thermal edge-folding machine 74, or be used separately from an edge-fold process. Stated differently, the thermal edge-folding machine 74 may be used to support the mandrel 70 and a heating element 72, and position the headliner 18 including the substrate 50 into an appropriate position to allow the mandrel 70 to form the groove 20 in the headliner 18. Incorporating the mandrel 70 and heating element 72 on the thermal edge-folding machine 74 further aids to reduce additional tooling to form the groove 20 in the headliner 18.

Referring to FIGS. 4A-4E, schematic side views depicting steps in the method to form the groove 20 in the headliner 18 are depicted. Specifically, the headliner 18 including the substrate 50 are depicted as supported on the thermal-folding machine 74 between the mandrel 70 and the heating element 72. The heating element 72 may be disposed between two plates 76, which are used to support the substrate 50. The heating element 72 may provide localized heating to the substrate 50, and, more specifically, the second side 54 of the substrate 50. As will be described in more detail below, localized heating of the substrate 50 allows the mandrel 70 to press into and expand the first side 52 of the substrate 50 to form the groove 20 in the headliner 18. Additionally, the mandrel 70 may include a plunger 78 that expands the first side 52 of the substrate 50 to create the groove 20 in the headliner 18. Again, the thermal-folding machine 74 may be configured to support the plates 76 on either side of the heating element 72 and drive the mandrel 70 and plunger 78 into the first side 52 of the substrate 50 to form the groove 20 in the headliner 18.

FIG. 4A depicts the heating element 72 between the two plates 76 being applied to the second side 54 of the substrate 50. Again, the heating element 72 is applied to the second side 54 of the substrate 50 in a localized manner such that an area 80 of the substrate 50 is able to be molded into the groove 20. The area 80 may be aligned with the mandrel 70 including the plunger 78. As heat is transferred from the heating element 72 through the second side 54 of the substrate 50, the area 80 becomes moldable such that the first side 52 of the substrate 50 receives the mandrel 70 being driven by the thermal-folding machine 74. As shown, the heating element 72 allows the area 80 to mold into the groove 20 with the headliner 18 being assembled on the substrate 50. The headliner 18 may be adhered to the substrate 50. In at least one other instance, the headliner 18 may be deposited on, bonded to, or fastened with the substrate 50. Forming the groove 20 in the headliner 18, which is assembled with the first side 52 of the substrate 50, reduces manufacturing complexity and allows for seamless integration of the light emitting material 26 and the headliner 18.

FIG. 4B schematically depicts the mandrel 70 pressing into the headliner 18 and substrate 50 to form the groove 20. Specifically, the mandrel 70 presses the headliner 18 and the substrate 50 at the area 80 such that the substrate 50 extends in a direction of an insertion force of the mandrel 70 on the headliner 18 at the area 80. The area 80 of the substrate 50 extends in the direction of the insertion force from the mandrel 70 due to heating from the heating element 72, as previously discussed. As shown in FIG. 4B, the area 80 of the substrate 50 is shown extending between the plates 76 of the thermal-folding machine 74. This is merely exemplary and highly schematic.

The arrangement of the plates 76 may be based on an optimized attachment with the thermal-folding machine 74 to accurately and efficiently form the groove 20 in the headliner 18. Using the mandrel 70 with the thermal-folding machine 74 provides further accuracy and tolerance to the depth 58 of the groove 20, as previously discussed. Stated differently, the thermal-folding machine 74 drives the mandrel 70 into the headliner 18 at the area 80 of the substrate 50 to the depth 58 of the groove 20. Again, the depth 58 may be set based on vehicle style, size, or type. The mandrel 70 forms the groove 20 in the headliner 18 based on material characteristics of the substrate 50, which allows the substrate 50 to extend in the direction of the insertion force of the mandrel 70 and forms the groove 20 without fracturing the substrate 50.

The material characteristics of the substrate 50 allow formation of the groove 20 in the headliner 18 through application of heat, via the heating element 72, at the area 80 of the substrate 50 to mold the groove 20 in the headliner 18. The substrate 50 may be formed from a thermoplastic material. In at least one other instance, the substrate 50 may be a plastic, a resin, or a fiber composite material that allows formation of the groove 20 in the headliner 18 through application of heat, via the heating element 72, to the area 80 of the substrate 50. In a similar manner, the headliner 18 may be formed from a material having characteristics that allow the headliner 18 to extend in the direction of the insertion force of the mandrel 70. Therefore, the headliner 18 may be formed from a fabric material. In at least one other instance, the headliner 18 may be formed from a thermoplastic material, a resin, an elastic material or any other material having characteristics that allow the headliner 18 to extend in a direction of insertion force of the mandrel 70 to form the groove 20. Extending the headliner 18 along with the substrate 50 provides aesthetic appeal to the headliner 18.

FIG. 4C depicts further formation of the groove 20 in the headliner 18 using the mandrel 70 and the plunger 78. As shown in FIG. 4C, the plunger 78 extends into the mandrel 70 and expands an end 82 of the mandrel 70. The end 82 of the mandrel 70 may include first and second portions 84, 86 that expand a diameter 88 of the groove 20. The diameter 88 of the groove 20 may be greater than the diameter 60 of the light emitting material 26. The diameter 88 of the groove 20 is greater than the diameter 60 of the light emitting material 26 to ensure that the light emitting material 26 is secured in the groove 20. Again, the plunger 78 may extend into the mandrel 70 and expand the end 82 of the mandrel 70 at the area 80 of the substrate 50. Therefore, a size of the end 82 of the mandrel 70 may be based on an allowable diameter 88 of the groove 20 to receive the light emitting material 26 such that expanding the first and second portions 84, 86 expands the groove 20 to secure the light emitting material 26 in the headliner 18.

As shown, the plunger 78 extends through the mandrel 70 to actuate movement of the first and second portions 84, 86 of the end 82 of the mandrel 70. Again, the first and second portions 84, 86 of the end 82 are oppositely orientated and move away from a center 90 of the mandrel 70 in response to the plunger 78 extending through the mandrel 70. This allows the mandrel 70 to more accurately and efficiently form the groove 20 in the headliner 18. Stated differently, the plunger 78 may extend along the center 90 of the mandrel 70 to move the first and second portions 84, 86 of the end 82 of the mandrel 70 away from the center 90 in substantially equal distances to expand the diameter 88 of the groove 20. Therefore, the groove 20 may have first and second sections 92, 94 to secure the light emitting material 26 in the groove 20. The groove 20 defining first and second sections 92, 94 is due to the plunger 78 expanding the end 82 of the mandrel 70. The first and second sections 92, 94 secure the light emitting material 26 without use of fasteners or bezels since a width 96 of the first section 92 may be less than the diameter 88 of the second section 94 of the groove 20.

Figure 4D:
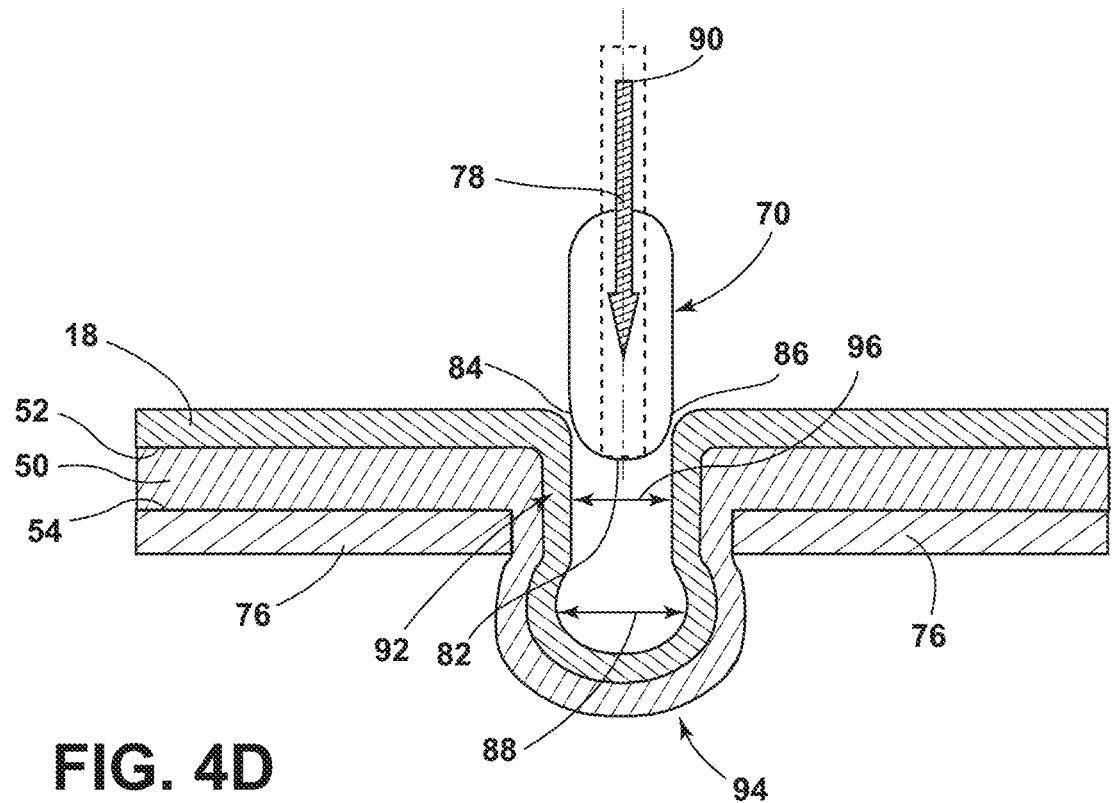

FIG. 4D depicts removal of the mandrel 70 and plunger 78 from the headliner 18 to define the groove 20 in the headliner 18. To remove the mandrel 70 from the headliner 18, the plunger 78 extends away from the end 82, which causes the first and second portions 84, 86 of the end 82 to retract toward the center 90 of the mandrel 70. Retracting of the first and second portions 84, 86 of the end 82 toward the center 90 of the mandrel 70 allows the mandrel 70 to slide from the second section 94 through the first section 92 of the groove 20. Stated differently, if the plunger 78 extends away from the end 82, the first and second portions 84, 86 fold back to approximate the width 96 of the first section 92 being less than the diameter 88 of the second section 94 of the groove 20. This allows the mandrel 70 to be removed from the headliner 18 after formation of the groove 20. Removal of the mandrel 70 may be effectuated when the substrate 50 cools such that the second section 94 of the groove 20 solidifies the diameter 88 without deforming the groove 20.

Figure 4E:
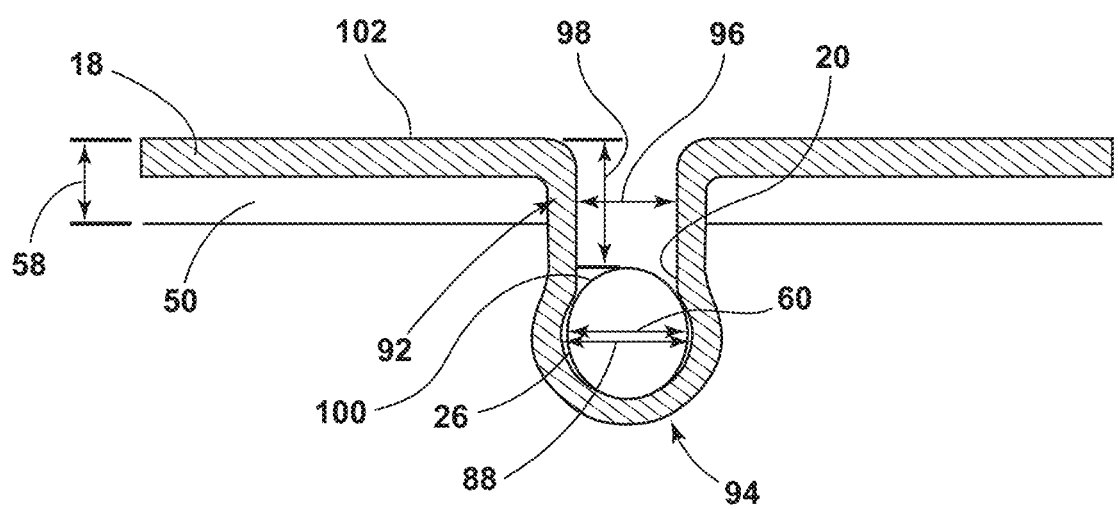

FIG. 4E schematically depicts the light emitting material 26 supported by the second section 94 of the groove 20 in the headliner 18. As can be seen in FIG. 4E, the diameter 88 of the second section 94 of the groove 20 may be greater than the diameter 60 of the light emitting material 26. Likewise, FIG. 4D depicts the width 96 of the first section 92 of the groove 20 being less than the diameter 60 of the light emitting material 26 to encapsulate the light emitting material 26 in the headliner 18. Therefore, the width 96 of the first section 92 of the groove 20 may be based on the diameter 60 of the light emitting material 26 such that the light emitting material 26 maintains a position in the headliner 18. The first section 92 of the groove 20 may further define a length 98.

The length 98 of the first section 92 of the groove 20 may be based on the predetermined distance 62 from an outer surface 100 of the light emitting material 26 to and an exterior surface 102 of the headliner 18. Again, the predetermined distance 62 may be between 2-5 mm, and more preferably between 2-3 mm, to be aesthetically pleasing and appear flush with the headliner 18. Therefore, the groove 20 allows the headliner 18 to support the light emitting material 26 continuously around the area 24 of the roof panel 14 to efficiently and effectively further illuminate the interior area 12 of the vehicle 10. Specifically, the first and second sections 92, 94 of the groove 20 are dimensioned to support the light emitting material 26 in the headliner 18.

It is to be understood that variations and modifications can be made on the aforementioned structure without departing from the concepts of the present invention, and further it is to be understood that such concepts are intended to be covered by the following claims unless these claims by their language expressly state otherwise.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A headliner for a vehicle, comprising:
   a substrate that attaches to, and covers a roof panel, the substrate spanning a substantially entire length and a substantially entire width of the roof panel, the substrate defining a groove on a first side formed around an entirety of a periphery of an area of the roof panel to emphasize a feature on the headliner, wherein the area is configured to receive a sunroof or a moonroof, and wherein the groove is continuous around the periphery; and
   a light emitting material disposed within the groove formed in the substrate, and being uninterrupted around the periphery within the groove.

2. The headliner of claim 1, wherein the groove defines first and second sections, the first section having a width being less than a diameter of the second section and a diameter of the light emitting material.

3. The headliner of claim 1, wherein the sunroof or moonroof comprises a window such that the light emitting material extends around a periphery of the window.

4. The headliner of claim 1, wherein the substrate is configured to be heated on a second side to form the groove.

5. The headliner of claim 1, wherein the groove is formed at a predetermined distance into the headliner from the first side toward a second side such that the light emitting material and first side are flush.

6. The headliner of claim 5, wherein the predetermined distance is between 2 to 3 millimeters.

7. The headliner of claim 1, wherein the groove is formed by a mandrel having an end such that first and second portions of the mandrel are oppositely oriented and expand away from a center of the mandrel to a distance greater than a diameter of the light emitting material.

8. A vehicle, comprising:
   a roof panel having a headliner attached thereto, the headliner spanning a substantially entire length and a substantially entire width of the roof panel, wherein the headliner includes a groove, being continuous, formed around an entirety of a periphery of an area to emphasize a feature on the headliner,
   a sunroof or moonroof received within the area; and
   a light emitting material disposed within the groove such that light from the light emitting material is directed toward an interior of the vehicle.

9. The vehicle of claim 8, wherein the headliner includes a substrate having a first side, and a second side, wherein the groove and light emitting material are disposed on the first side of the substrate.

10. The vehicle of claim 9, wherein the groove is formed with a mandrel having an end that expands the first side of the substrate in response to a plunger sliding within the mandrel in a direction of the second side with heat being applied to the second side.

11. The vehicle of claim 10, wherein the end of the mandrel includes two, oppositely oriented portions that expand to a width greater than a diameter of the light emitting material.

12. The vehicle of claim 8, wherein the groove is molded in a headliner form tool to match a contour of the headliner.

13. The vehicle of claim 8, wherein the groove defines a depth such that the light emitting material is flush with the substrate of the headliner.

14. The vehicle of claim 8, wherein the groove is continuous such that the light emitting material extends around the periphery of a window being the area to emphasize a feature on the headliner, uninterrupted.

15. A method of forming a headliner for a vehicle comprising:
   forming a substrate having first and second sides and configured to span a substantially entire width and a substantially entire length of a roof panel, the substrate defining an area configured to receive a sunroof or a moonroof;
   heating the second side of the substrate;
   driving a mandrel into the first side of the substrate;
   actuating a plunger through the mandrel such that first and second portions of the mandrel expand away from a center of the plunger to form a groove within the first side of the substrate; and
   retracting the plunger and mandrel from the substrate.

16. The method of claim 15 further comprising inserting a light emitting material into the groove.

17. The method of claim 16, wherein inserting the light emitting material into the groove includes extending the light emitting material around a periphery of a roof panel, the light emitting material being uninterrupted around the periphery.

18. The method of claim 15 further comprising forming the groove to match a contour of the headliner.

19. The method of claim 15, wherein actuating the plunger defines a depth of the groove such that the light emitting material is flush with the second side of the substrate.

20. The method of claim 15, wherein the first and second portions of the mandrel expand to a diameter greater than a diameter of the light emitting material.

* * * * *